US006693404B2

(12) United States Patent
Hiraga et al.

(10) Patent No.: US 6,693,404 B2
(45) Date of Patent: Feb. 17, 2004

(54) AC CURRENT DETECTING DEVICE FOR INVERTER APPARATUS AND AC CURRENT DETECTING METHOD THEREFOR

(75) Inventors: Masahiro Hiraga, Ome (JP); Junji Kato, Takaishi (JP); Tetsuya Kimura, Chiba (JP); Teiichi Furukawa, Narashino (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/092,663

(22) Filed: Mar. 6, 2002

(65) Prior Publication Data

US 2003/0020430 A1 Jan. 30, 2003

(30) Foreign Application Priority Data

Jul. 27, 2001 (JP) ........................................ 2001-228145

(51) Int. Cl.[7] .............................................. H02P 7/36
(52) U.S. Cl. ...................................... 318/729; 318/727
(58) Field of Search ................................ 318/729, 807, 318/809, 779, 727; 323/910

(56) References Cited

U.S. PATENT DOCUMENTS

| 4,134,055 A | * | 1/1979 | Akamatsu | 318/696 |
| 4,328,454 A | * | 5/1982 | Okuyama et al. | 318/803 |
| 4,520,298 A | * | 5/1985 | Abbondanti | 318/490 |
| 4,788,485 A | * | 11/1988 | Kawagishi et al. | 318/811 |
| 5,089,760 A | * | 2/1992 | Joyner, Jr. | 318/798 |
| 5,206,575 A | * | 4/1993 | Nakamura et al. | 318/807 |
| 5,663,627 A | * | 9/1997 | Ogawa | 318/803 |

FOREIGN PATENT DOCUMENTS

| JP | 04-178197 | 6/1992 |
| JP | 04-207992 | 7/1992 |
| JP | 05-103496 A | 4/1993 |

OTHER PUBLICATIONS

Blaabjerg et al. "Modulation and Current Sensing Technique—An Integrated Part for Low–cost Motor–Drive," Industrial Electronics, ISIE '96 Proceeding of the IEEE International Symposium Jun. 17–20, 1996, vol. 1, pp 476–481 (1996).

* cited by examiner

Primary Examiner—Robert Nappi
Assistant Examiner—Renata McCloud
(74) Attorney, Agent, or Firm—Townsend and Townsend and Crew LLP

(57) ABSTRACT

Establishing a current detection system good in accuracy allows implementation of a reduction in the size of an inverter apparatus good in current detection accuracy, even if the number of current sensors is reduced.

A current sensor of a DC section and a current sensor corresponding to one phase of an output AC current are used, and means for determining switching patterns of DC main elements and determining a current component of Idc or means for detecting a maximum value of Idc is used, thereby determining an AC current value and a power factor angle.

7 Claims, 5 Drawing Sheets

AC CURRENT DETECTING DEVICE FOR INVERTER APPARATUS AND AC CURRENT DETECTING METHOD THEREFOR

BACKGROUND OF THE INVENTION

1. Field of the Invention

The present invention relates to an inverter apparatus for outputting a three-phase AC voltage having an arbitrary frequency from a DC voltage to thereby vary the speed of an induction motor, and particularly to an inverter apparatus which needs the detection of an output AC current, and an AC current detecting method therefor.

2. Description of the Related Art

As disclosed in Japanese Patent Application Laid-Open No. Hei 4(1992)-178197, a current detecting circuit for detecting motor's instant phase currents of respective U, V and W phases may be provided to obtain the values of three-phase AC currents. Incidentally, the present publication shows that the instant currents of the respective phases are determined using this current detecting circuit and a current detecting circuit for detecting a DC output current, and the determined currents are added together to thereby obtain power consumed by a load.

If output AC currents of at least two phases or more can be theoretically detected, then output AC currents of three phases are obtained as the three-phase AC currents. Thus, output AC current values and a power factor angle are obtained.

Therefore, in the conventional inverter apparatus, a current sensor has been provided for at least two phase or more of output AC currents where it is necessary to carry out current detection good in accuracy.

A reduction in the size of the inverter apparatus has been advanced in recent years. An occupied physical size of a current sensor for detecting phase AC currents in the inverter apparatus has become innegligible.

While there is also known means for detecting only a current of a DC section and estimating the state of an AC current, only the current of the DC section allows detection of only an effective current component of the AC current and disables detection of an ineffective current component. Therefore, a true AC current value and a power factor angle cannot be obtained.

While the provision of an AC current detecting sensor and a DC current detecting sensor has been described in Japanese Patent Application Laid-Open No. 4(1992)-207992, these current sensors are provided as abnormal or improper signal detecting sensors. They are not provided for determining an output AC current value and a power factor.

An object of the present invention is to provide a technology for establishing a high-accuracy current detecting system using a less number of current sensors and implementing a reduction in the size of an inverter apparatus good in current detection accuracy.

SUMMARY OF THE INVENTION

If an AC current value |I1| and a power factor angle θ can be obtained by performing detection of a current Idc of a DC section and detection of an AC current Iu, then the accuracy of current detection becomes satisfactory.

To this end, there is a need to provide either one of means for determining switching patterns of main elements and determining a current component of Idc and means for detecting a maximum value of Idc. Providing both the means for determining the switching patterns of the main elements and determining the current component of Idc and the means for detecting the maximum value of Idc allows more stable current detection.

Thus, it is feasible to reduce the number of current sensors, enhance the accuracy of detection of an AC current of an inverter apparatus, and bring the inverter apparatus into less size.

DESCRIPTION OF THE PREFERRED EMBODIMENTS

Preferred embodiments of the present invention will hereinafter be described with reference to the accompanying drawings by several illustrated examples.

Figure 1:
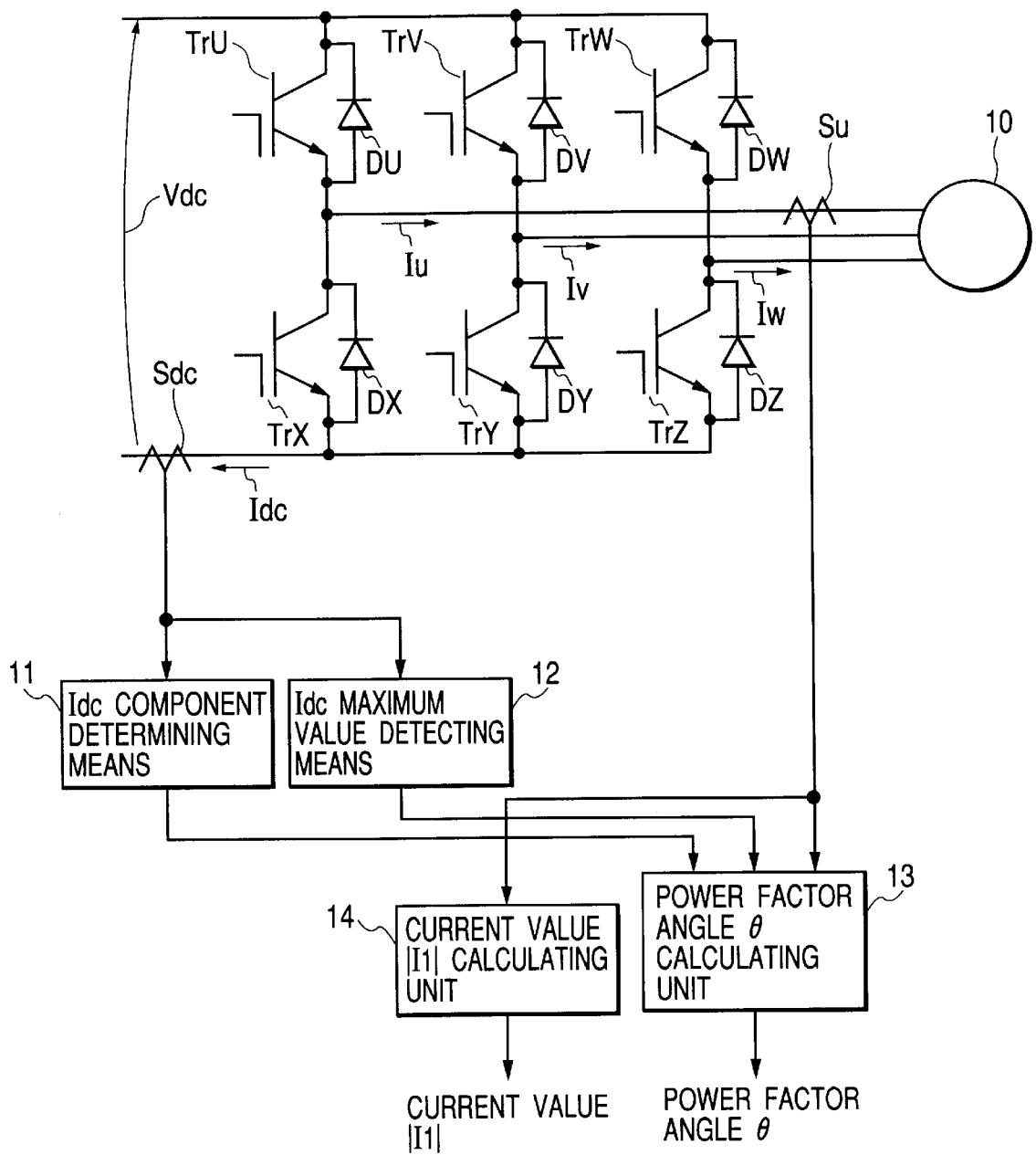
FIG. 1 is a diagram showing the principle of an AC current detecting device suitable for used in an inverter apparatus according to the present invention.

FIG. 1 is a diagram showing the principle of an AC current detecting device employed in an inverter apparatus according to the present invention. The device shown in the drawing includes transistors TrU, TrV, TrW, TrX, TrY and TrZ corresponding to main elements for generating a final output controlled by a PWM system from a DC voltage section Vdc, diodes DU, DV, DW, DX, DY and DZ respectively connected in parallel with these transistors, a current sensor Sdc for detecting a current Idc flowing through the DC voltage section, and an AC current sensor Su for detecting one arbitrary output AC current Iu of three-phase AC currents. Reference numeral 10 indicates an induction motor which is controlled by currents of U, V and W phases, i.e., currents Iu, Iv and Iw.

Further, the device is equipped with Idc component determining means 11 for determining whether the DC current Idc detected by the DC current sensor Sdc is detected as any of the currents of the U, V and W phases, i.e., any of the currents Iu, Iv and Iw, Idc maximum value detecting means 12 for detecting a maximum value of the current Idc during a predetermined time, power factor angle calculating unit 13 for calculating a power factor from the value of the AC current detected by the AC current sensor Su, e.g., the AC current Iu, and the outputs of the Idc component determining means 11 and the Idc maximum value detecting means 12, and a current value |I1| calculating unit 14 for calculating a current value |I1| from the AC current Iu detected by the AC current sensor Su. The power factor angle calculating unit 13 determines a power factor angle θ, and the current value |I1| calculating unit 14 determines a current value |I1|. Incidentally, the maximum value of Idc is produced six times during one cycle in the case of the three-phase AC currents.

Figure 2:
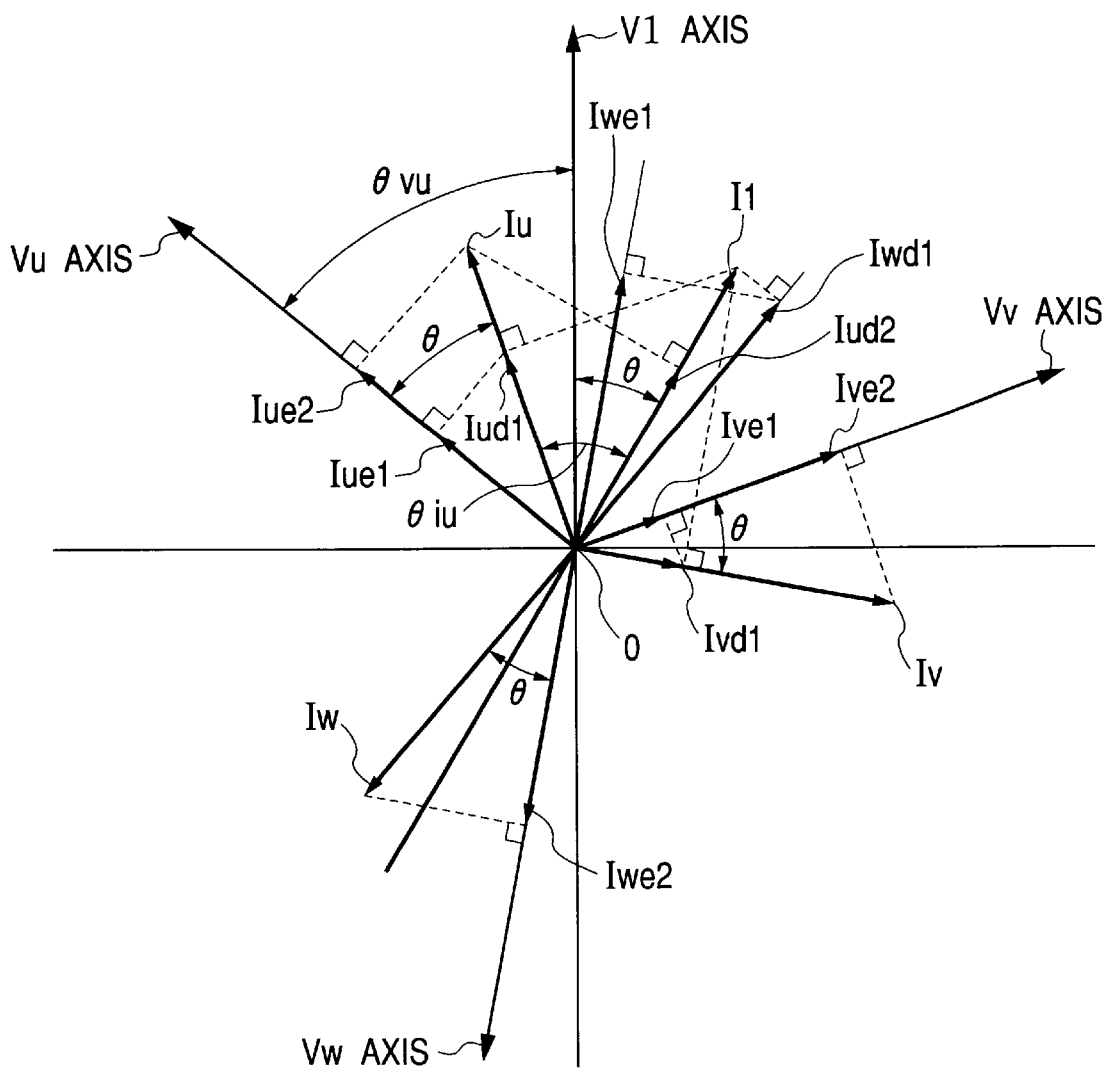
FIG. 2 is a vector diagram illustrating the relationship between respective voltages and detected currents.

FIG. 2 is a vector diagram showing the relationship between respective voltages and detected currents.

In FIG. 2, the direction of a basic vector axis of an output voltage of the inverter apparatus is plotted in the direction of a stationary coordinate V1 axis, the direction of a U-phase voltage vector in three-phase output voltages corresponding to actual outputs is plotted in the direction of a Vu axis, the direction of a V-phase voltage vector is plotted in the direction of a Vv axis, and the direction of a W-phase voltage vector is plotted in the direction of a Vw axis, respectively. The origin points of the respective coordinates and vectors in FIG. 2 are defined as 0, and the Vu axis, Vv axis and Vw axis indicate rotational coordinates respectively. The difference in phase between the respective adjacent axes is always taken as $(2 \cdot \pi/3)$ rad. They are rotated counterclockwise and clockwise with the origin point O as the center according to the output of the inverter apparatus.

Next consider where an induction motor is connected as a load on the output side of the inverter apparatus. In this case, the vector relationship between the voltages and currents of such three-phase AC outputs as shown in FIG. 2 is established.

Now consider where a given three-phase AC voltage is outputted in FIG. 2. In this case, a phase voltage to be outputted is first determined, and the vector direction is plotted in the direction above the V1 axis. Consider where this V1 is converted (rotated) into voltage coordinate axes of the respective phases, which in turn are defined as Vu, Vv and Vw respectively, and voltage vectors corresponding to these three phases are rotated at a given angular frequency ω. Assuming that respective line currents that flow with the respective phase voltages, are respectively defined as Iu, Iv and Iw, they are represented as shown in FIG. 2. Here, θ in FIG. 2 indicates a power factor angle determined depending on the state of the induction motor.

Since |Iu|=|Iv|=|Iw| in the case of a three phase alternating current, Iu from the Vu axis, Iv from the Vv axis and Iw from the Vw are all identical in relation to one another. When conversion opposite to the conversion of V1 into the voltage axes of the respective phases is effected on Iu, Iv and Iw, all of Iu, Iv and Iw result in I1 in FIG. 2. Thus, the line current that flows with the previously-determined V1, can be represented as I1. If the power factor angle θ is decided, then the relation of the power factor angle to the V1 axis is uniquely determined. If the relationship between V1 and I1 is determined, then Iu, Iv and Iw can be detected.

A current I1 is first determined in the AC current detecting device shown in FIG. 1.

Since a value detectable by the AC current sensor Su attached to the U phase of an AC section shown in FIG. 1 is one detected as a result of projection of I1 on the Iu axis, it is represented as Iud1 in FIG. 2 from the following equation:

$$Iud1 = |I1|\cos \theta iu \quad (1)$$

Since an angle θiu formed between Iu and I1 is a shared angle and |Iu|=|I1| herein, the magnitude |Iud2| of Iud2 obtained by projecting Iu onto the I1 axis, and |Iud1| are equal to each other. Thus, Iud2 is given as follows:

$$Iud2 = |Iu|\cos \theta iu = |I1|\cos \theta iu \quad (2)$$

Further, the angle θiu formed between Iu and I1 is determined from an angle θvu formed between the Vu axis and the V1 axis and a power factor angle θ. This angle is represented as follows:

$$\theta iu = \theta vu - \theta + \theta = \theta vu \quad (3)$$

Since θvu is an angle of rotation of the Vu axis to the V1 axis at this time, it is determined based on an output angular frequency ω and time t. Therefore, θvu results in a default value.

Since, at this time, |Iu|=|I1| and θvu is of the default value, |Iu| and |I1| are represented as follows:

$$|Iu| = |Iud2|/\cos \theta vu \quad (4)$$

$$|I1| = Iud1/\cos \theta vu \quad (5)$$

Thus, |I1| is determined. When, however, cos θvu=0, i.e., the angle θvu formed between the V1 axis and the Vu axis is given as $(\pi/2)$ rad and $(3 \cdot \pi/2)$ rad, the above equation |I1| has no solution and is brought into a non-detectable state. However, since a change Δ cos θvu with respect to the immediately preceding cos θvu at this time is as nearly zero as possible, an instant current |I1| at cos θvu=0 can make an approximation to |I1|=|I1(n−1)| if the current |I1| that has flowed immediately before cos θvu=0, is given as |I1|(n−1). Thus, |I1| is determined from the following equation:

$$|I1| = |Iud1|/\cos \theta vu \quad (6)$$

When, however, θvu is represented as $(\pi/2)$ rad and $(3 \cdot \pi/2)$ rad, |I1| is given as follows:

$$|I1| = |I1|(n-1) \quad (7)$$

One embodiment of an AC current detecting device employed in an inverter apparatus according to the present invention will be explained below.

Figure 3:
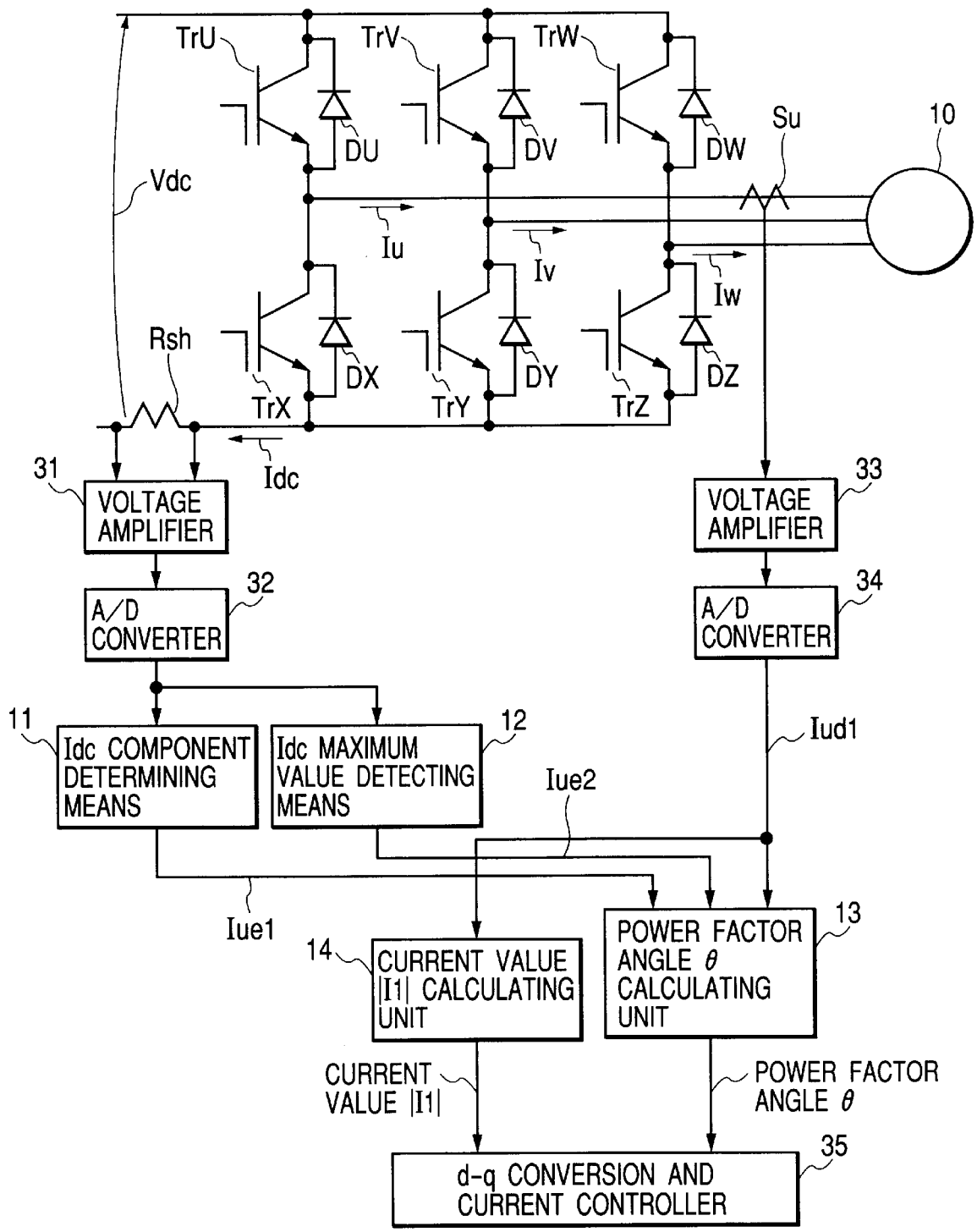
FIG. 3 is a block diagram depicting one embodiment of an AC current detecting device suitable for use in an inverter apparatus according to the present invention.

FIG. 3 is a block diagram showing one embodiment of the AC current detecting device employed in the inverter apparatus according to the present invention. The same elements of structure as those shown in FIG. 1 are respectively identified by the same reference numerals and the description thereof will therefore be omitted.

In the drawing, a shunt resistor Rsh is provided as a DC current sensor Sdc. A voltage applied across the shunt resistor Rsh is inputted to a voltage amplifier 31 and converted into digital form by an A/D converter (analog/digital converter) 32, followed by supply to Idc component determining means 11 and Idc maximum value detecting means 12. The outputs of the Idc component determining means 11 and the Idc maximum value detecting means 12 are supplied to a power factor angle θ calculating unit 13.

An AC current detected by an AC current sensor Su is amplified by a voltage amplifier 33 and thereafter converted into digital form by an A/D converter 34, which in turn is supplied to the power factor angle θ calculating unit 13 and a current value |I1| calculating unit 14. A power factor angle θ and a current value |I1| respectively calculated thereby are inputted to a d-q conversion and current controller 35 to determine exciting currents id and iq for a d axis and a q axis, thereby making it possible to control an induction motor 10.

Described in further details, in the embodiment of FIG. 3, a current Idc of a DC section is first allowed to flow through the shunt resistor Rsh and current/voltage-converted, followed by its detection. Thereafter, the voltage amplifier 31 effects amplification matched with scale gain of the A/D converter 32 corresponding to a next state on the detected voltage. Afterwards, the A/D converter 32 converts it into a digital value. The Idc component determining means 11 determines Iue1, and the Idc maximum value detecting means 12 determines Iue2. They are outputted to the power factor angle θ calculating unit 13.

On the other hand, an AC current corresponding to one phase is current/voltage-converted by the AC current sensor Su, followed by its detection. Afterwards, the voltage amplifier 33 effects amplification matched with scale gain of the A/D converter 34 of a next stage on the detected voltage. Thereafter, Iud1 converted into a digital value by the A/D converter 34 is outputted to the current value |I1| calculating unit 14 and the power factor angle θ calculating unit 13.

The current value |I1| calculating unit determines a current value |I1| form the input Iud1 and the known θvu and outputs it therefrom. Further, the power factor angle θ calculating unit 13 determines θ from the input Iue1, Iue2 and Iud1 and the known θvu and outputs it therefrom.

Since the relation between V1 and I1 is understood from |I1| and θ referred to above, d-q conversion is performed so that current control can be carried out.

Since the power factor angle θ calculating unit 13 determines the power factor angle θ, using Iue1, Iue2 and Iud1 and the known θvu in the present embodiment, the power factor angle θ can be accurately determined.

As methods for determining power factor angles θ, may be mentioned, a method for detecting a current Idc of a DC section in accordance with switching timing and patterns of main elements and detecting an AC current value corresponding to one phase to thereby determine a power factor angle, and a method for detecting a maximum value of a current Idc of a DC section and detecting an AC current value corresponding to one phase to thereby determine a power factor angle.

The method of detecting the DC current Idc in conformity to the switching timing and patterns of the main elements and detecting the AC current value corresponding to one phase to thereby determine the power factor angle will first be described.

The values detectable by the current sensor Sdc of the DC section shown in FIG. 1 are respectively Iu, Iv and Iw. They respectively have effective current components detected as Iue1, Ive1 and Iwe1 obtained by projecting Iud1, Ivd1 and Iwd1 on their corresponding voltage axes Vu, Vv and Vw.

Since ineffective current components of Iu, Iv and Iw are of current components which are produced by a back electromotive force of the motor, they flow through a path made up of a parallel circuit of the transistors TrU, TrV, TrW, TrX, TrY and TrZ corresponding to the main elements and the diodes DU, DV, DW, DX, DY and DZ. Further, they reflow between the path and the induction motor (motor) 10. Accordingly, no ineffective current components appear on the current Idc of the DC section shown in FIG. 1.

Consider on and off switching patterns of the main elements. However, the transistors TrU and TrX, transistors TrV and TrY and transistors TrW and TrZ are controlled exclusively to one another. Only combinations of on and off patterns of the transistors TrX, TrY and TrZ are considered herein.

Assuming that when the respective main elements are held on, they are respectively represented as TrX=1, TrY=1 and TrZ=1, and when the main elements are held off, they are respectively represented as TrX=0, TrY=0 and TrZ=0, the current Idc of the DC section can be represented as follows:

$$Idc = Iue1 \cdot Trx + Ive1 \cdot TrY + Iwe1 \cdot TrZ \quad (8)$$

From the above equation,

When a condition 1: TrX=TrY=TrZ=0, Idc=0.

When a condition 2: TrX=TrY=TrZ=1, Idc=Iue1+Ive1+Iwe1.
From Iue1+Ive1+Iwe1=0, Idc=0.

When a condition 3: TrX=1 and TrV=TrZ=0, Idc=Iue1.

When a condition 4: TrX=TrY=1 and TrZ=0, Idc=Iue1+Ive1.
From Iue1+Ive1+Iwe1=0, Idc=−Iwe1.

When a condition 5: TrX=TrZ=1 and TrY=0, Idc=Iue1+Iwe1.
From Iue1+Ive1+Iwe1=0, Idc=−Ive1.

When a condition 6: TrY=1 and TrX=TrZ=0, Idc=Ive1.

When a condition 7: TrY=TrZ=1 and TrX=0, Idc=Ive1+Iwe1.
From Iue1+Ive1+Iwe1=0, Idc=−Iue1.

When a condition 8: TrZ=1 and TrX=TrV=0, Idc=Iwe1.

Thus, respective line currents appear in Idc except for the conditions 1 and 2. Owing to this appearance, switching frequencies of the respective main elements are made sufficiently earlier than those of three-phase AC output currents, and sufficient early detection of Idc is effected on the switching frequencies of the main elements. Consequently, Idc can be detected every switching patterns, and hence Iue1, Ive1 and Iwe1 can be detected. They are represented as follows:

$$Iue1 = Iud1 \cdot \cos\theta \quad (9)$$

$$Ive1 = Ivd1 \cdot \cos\theta \quad (10)$$

$$Iwe1 = Iwd1 \cdot \cos\theta \quad (11)$$

They are detected as those projected on the Vu axis, Vv axis and Vw axis used as their voltage axes.

Since one detectable by the AC current sensor Su is Iud1 herein, attention will be focused on Iue1=Iud1·cos θ. Consequently, the following equation is obtained:

$$\cos\theta = Iue1/Iud1 \quad (12)$$

where Iud1 is detected by the current sensor Su, and Iue1 is detected by the current sensor Sdc on condition that (when TrY=TrZ=1 and TrX=0, Idc=−Iue1) and (when TrX=1 and TrV=TrZ=0, Idc=Iue1).

Thus, the power factor angle θ results in θ=cos$^{-1}$ (Iue1/Iud1). However, when Iud1=0, the above equation cos θ has no solution and is hence brought into a non-detectable state. This state takes place at the instant when the Iu axis and the I1 axis are orthogonal to each other.

On the other hand, when consideration is given to the case in which the power factor angle does not vary greatly for each instant, the power factor angle at the induction motor can be made approximate to θ=θ(n−1) at the instant of Iud1=0 if θ immediately prior to Iud1=0 is regarded as θ(n−1).

Further, the instant when the Iu axis and the I1 axis intersect at the right angles, corresponds to the time when θvu is given as (π/2) rad and (3·π/2) rad and takes place simultaneously when |I1| is subjected to approximate processing. Thus, the power factor angle θ is as follows:

$$\theta = \cos^{-1}(Iue1/Iud1) \quad (13)$$

However, when θvu is given as (π/2) rad and (3·π/2) rad, the power factor angle is obtained from the following equation:

$$\theta = \theta(n-1) \quad (14)$$

The method of detecting the maximum value of the current Idc of the DC section and detecting the AC current value corresponding to one phase to thereby determine the power factor angle will next be described.

When Iu, Iv and Iw are projected on their corresponding voltage axes Vu, Vv and Vw, they result in Iue2, Ive2 and Iwe2 respectively. Since they are effective current components for the respective phases, they result in $|Iue2|=|Ive2|=|Iwe2|$. Iue2, Ive2 and Iwe2 respectively appear twice, i.e., six times in total during one cycle of an AC current as the maximum value of the current Idc of the DC section. They can be detected by the current sensor Sdc.

Look at the relationship among Iud1 detected by the AC current sensor Su, Iue2 detected by the DC current sensor Sdc, Iu an I1. Such a relation is given as follows:

$$Iue2=|Iu|\cos\theta \qquad (15)$$

$$Iud1=|I1|\cos\theta vu \qquad (16)$$

From $|Iu|=|I1|$, the following are obtained:

$$Iue2/\cos\theta=Iud1/\cos\theta vu \qquad (17)$$

$$\cos\theta=Iue2\cdot\cos\theta vu/Iud1 \qquad (18)$$

Thus, the power factor angle $\theta$ results in $\theta=\cos^{-1}$ (Iue2·cos θvu/Iud1) However, since the above equation cos θ has no solution when Iud1=0 in a manner similar to how to determine cos θ referred to above, similar approximate processing is carried out.

Thus, the power factor angle θ is given as follows:

$$\theta=\cos^{-1}(Iue2\cdot\cos\theta vu/Iud1) \qquad (19)$$

However, when θvu is given as (π/2) rad and (3·π/2) rad, θ is determined as follows:

$$\theta=\theta(n-1) \qquad (20)$$

Figure 4:
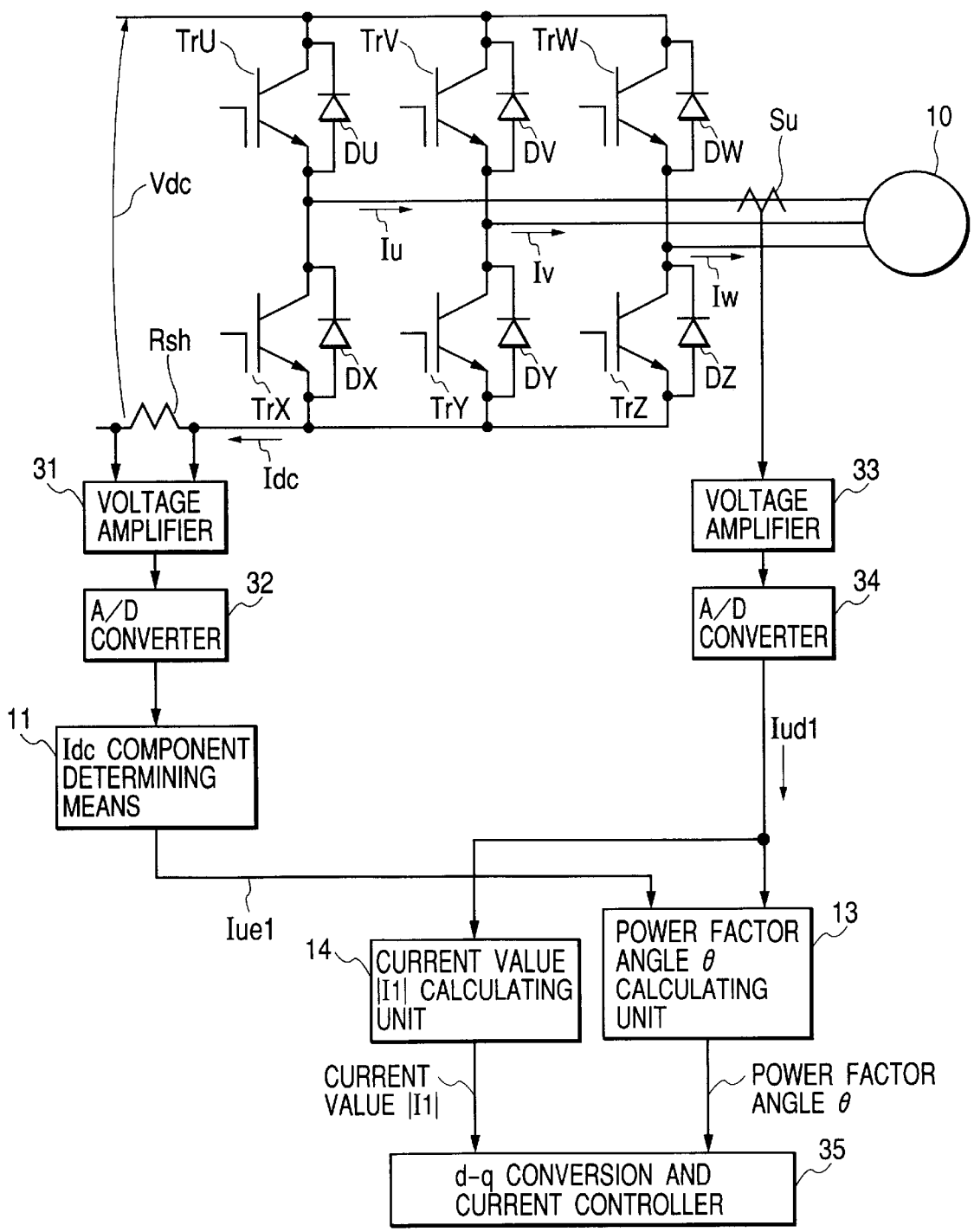
FIG. 4 is a block diagram showing another embodiment of an AC current detecting device suitable for use in an inverter apparatus according to the present invention.

FIG. 4 is a block diagram showing another embodiment of an AC current detecting device suitable for use in an inverter apparatus according to the present invention. The same elements of structure as those shown in FIG. 1 are respectively identified by the same reference numerals and the description thereof will therefore be omitted.

The present embodiment has been made in view of the fact that Iue1 outputted from Idc component determining means 11 and Iud1 detected by an AC current sensor Su are calculated to thereby obtain a power factor angle θ from the equations (13) and (14). In a manner similar to the embodiment shown in FIG. 3, a current value |I1| is calculated and determined by a current value |I1| calculating unit 14 from the input Iud1 and the already-known θvu.

Even in the case of the present embodiment, d-q conversion is finally performed based on the current value |I1| and the calculated angle θ, thereby making it possible to carry out current control on an induction motor 10.

Figure 5:
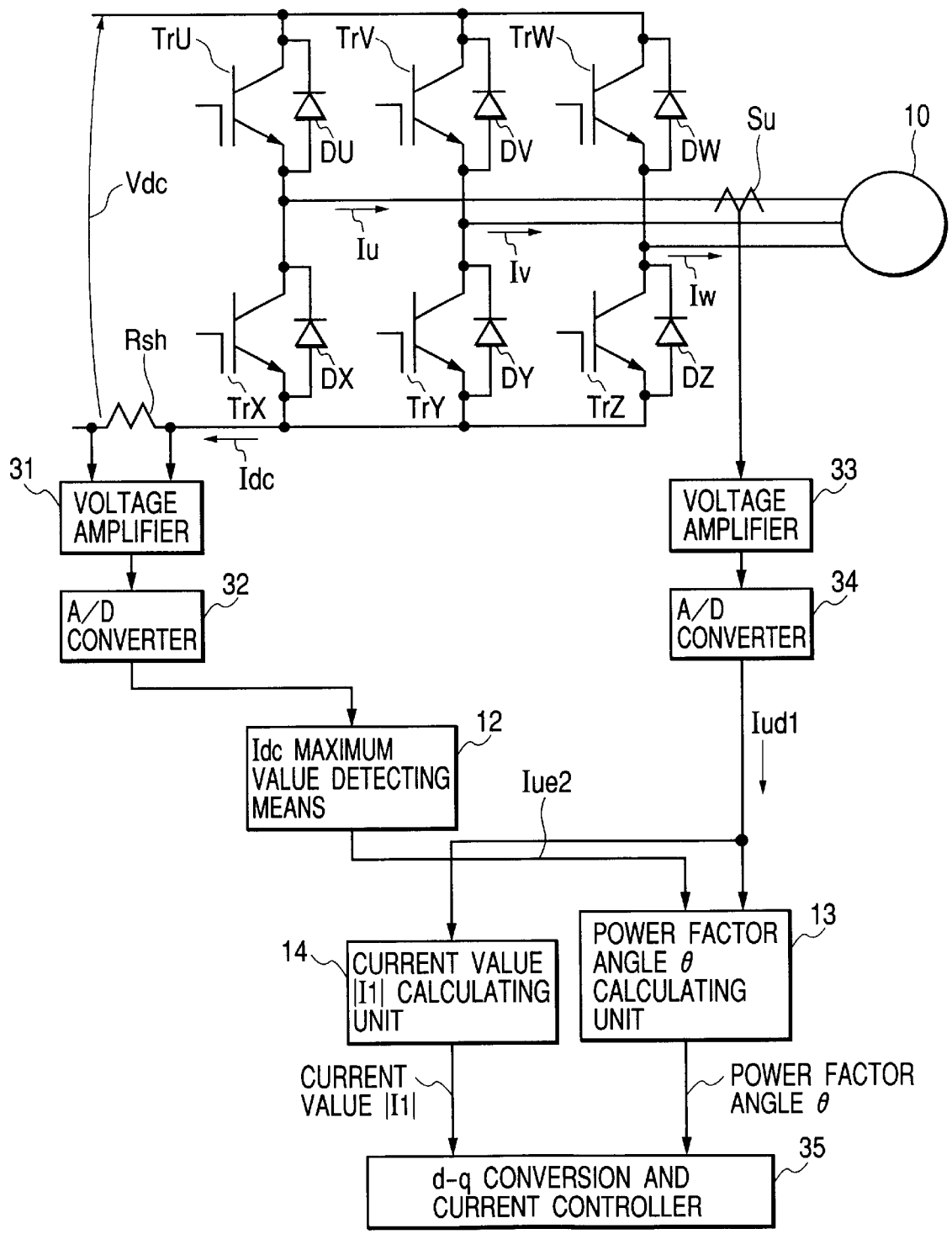
FIG. 5 is a block diagram illustrating a further embodiment of an AC current detecting device suitable for use in an inverter apparatus according to the present invention.

FIG. 5 is a block diagram showing a further embodiment of an AC current detecting device suitable for use in an inverter apparatus according to the present invention. The same elements of structure as those shown in FIG. 1 are respectively identified by the same reference numerals and the description thereof will therefore be omitted.

The present embodiment has been made in view of the fact that Iue2 outputted from Idc maximum value detecting means 12 and Iud1 detected by an AC current sensor Su are calculated to thereby obtain a power factor angle θ from the equations (19) and (20).

In a manner similar to the embodiment shown in FIG. 3, a current value |I1| is determined by calculation by a current value |I1| calculating unit 14 from the input Iud1 and the already-known θvu.

Even in the case of the present embodiment, d-q conversion is finally performed based on the current value |I1| and the calculated angle θ, thereby making it possible to carry out current control on an induction motor 10.

In the present invention as described above, a single AC current sensor is capable of determining the magnitude |I1| of an AC output current and a power factor angle θ, whereby the relationship between an AC voltage V1 and an AC current I1 can be detected. It is therefore possible to detect an output AC current of an inverter apparatus with satisfactory accuracy.

In the conventional inverter apparatus, an output AC section has needed two or more current sensors since output AC currents corresponding to two phases are detected where attempt is made to detect an AC current value and a power factor angle.

If a current sensor using a hall element is adopted in this case, then the current sensor itself is physically large in size, thus resulting in inhibition on a reduction in the size of the inverter apparatus. In view of the case where a shunt resistor or the like is used in an AC section to detect a current, dedicated power supplies are added in the form of two systems, and an adverse effect occurs due to the generated heat of shunt resistor, thus resulting in inhibition on a reduction in the size of an inverter apparatus in a manner similar to the current sensor using the hall element or the like.

According to the present invention, the detection of an AC current value and a power factor angle can be realized with a reduction in the number of current sensors.

According to the present invention as described above, an AC current sensor and a DC current sensor are respectively capable of obtaining an AC current value and a power factor angle singly.

What is claimed is:

1. An AC current detecting device, comprising:
   a DC current detector coupled to a DC section of an inverter apparatus and configured to detect a DC current flowing through the DC section;
   an AC current detector coupled to an AC section of the inverter apparatus and configured to detect a component of three-phase AC currents associated with the inverter apparatus, the three-phase AC currents comprising first component, second and third components;
   a DC current component determiner coupled to the DC current detector and configured to determine whether the DC current detected by the DC current detector corresponds to the first, second, or third component of the three-phase AC currents;
   a power factor angle calculator configured to calculate a power factor angle using information on the component of the three-phase AC currents detected by the AC current detector and an output of the DC current component determiner;
   an output current value calculator coupled to the AC current detector and outputs a current value of the component detected by the AC current detector;
   a first voltage amplifier coupled to the DC current detector;
   a first analog-digital converter coupled to the first voltage amplifier and the DC current component determiner;
   a second voltage amplifier coupled to the AC current detector; and
   a second analog-digital converter coupled to the second voltage amplifier, the power factor angle calculator, and the output current value calculator.

2. The device of claim 1, wherein the AC current detector is the only AC current detector in the device.

3. The device of claim 1, further comprising:
   a maximum current detecting unit configured to detect a maximum value of the DC current detected by the DC current detector.

4. The device of claim 1, further comprising:

a conversion and current controller coupled to the power factor angle calculator and the output current value calculator and configured to determine exciting currents for a first axis and a second axis to facilitate control of an induction motor.

5. An AC current detecting device, comprising:

a DC current detector coupled to a DC section of an inverter apparatus and configured to detect a DC current flowing through the DC section;

an AC current detector coupled to an AC section of the inverter apparatus and configured to detect a component of three-phase AC currents associated with the inverter apparatus, the three-phase AC currents comprising first component, second and third components;

a DC current component determiner coupled to the DC current detector and configured to determine whether the DC current detected by the DC current detector corresponds to the first, second, or third component of the three-phase AC currents;

a maximum current detecting unit configured to detect a maximum value of the DC current detected by the DC current detector;

a power factor angle calculator configured to calculate a power factor angle using information on the component of the three-phase AC currents detected by the AC current detector and an output of the DC current component determiner;

an output current value calculator coupled to the AC current detector and outputs a current value of the component detected by the AC current detector;

a first voltage amplifier coupled to the DC current detector; and a first analog-digital converter coupled to the first voltage amplifier and the maximum current detecting unit.

6. The device of claim 5, further comprising:

a second voltage amplifier coupled to the AC current detector; and a second analog-digital converter coupled to the second voltage amplifier, the power factor angle calculator, and the output current value calculator.

7. The device of claim 5, further comprising:

a conversion and current controller coupled to the power factor angle calculator and the output current value calculator and configured to determine exciting currents for a first axis and a second axis to facilitate control of an induction motor.

* * * * *